United States Patent
Wang et al.

(10) Patent No.: US 9,871,863 B2
(45) Date of Patent: Jan. 16, 2018

(54) MANAGING NETWORK ATTACHED STORAGE

(71) Applicant: EMC Corporation, Hopkinton, MA (US)

(72) Inventors: Tianqing Wang, Shanghai (CN); Kai Yan, Shanghai (CN); Feng Guo, Shanghai (CN); Qiyan Chen, Shanghai (CN); Yun Zhang, Shanghai (CN); Lin Peng, Shanghai (CN); Yicang Wu, Shanghai (CN); Zhihao Lu, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 350 days.

(21) Appl. No.: 14/572,029

(22) Filed: Dec. 16, 2014

(65) Prior Publication Data

US 2015/0189019 A1    Jul. 2, 2015

(30) Foreign Application Priority Data

Dec. 26, 2013    (CN) .......................... 2013 1 0750589

(51) Int. Cl.
*G06F 15/16*    (2006.01)
*H04L 29/08*    (2006.01)

(52) U.S. Cl.
CPC ...... *H04L 67/1097* (2013.01); *H04L 67/2842* (2013.01)

(58) Field of Classification Search
CPC .......................... H04L 67/1097; H04L 67/2842
See application file for complete search history.

(56) References Cited

U.S. PATENT DOCUMENTS

| | | | | |
|---|---|---|---|---|
| 2002/0161855 | A1* | 10/2002 | Manczak | G06F 17/301 709/219 |
| 2013/0138604 | A1* | 5/2013 | Ozawa | H04L 67/1097 707/609 |
| 2013/0297871 | A1* | 11/2013 | Reddy | G06F 3/0611 711/114 |
| 2014/0013051 | A1* | 1/2014 | Qian | G06F 3/0607 711/115 |
| 2014/0025770 | A1* | 1/2014 | Warfield | G06F 15/17331 709/213 |
| 2015/0127768 | A1* | 5/2015 | Zamir | H04L 67/1097 709/215 |

(Continued)

*Primary Examiner* — Jonathan Bui
(74) *Attorney, Agent, or Firm* — Konrad R. Lee; Krishnendu Gupta

(57) ABSTRACT

A method and apparatus for managing network attached storage that includes detecting frequency of access from a client to a data item that is in a first server in the network attached storage, a global namespace of the network attached storage indicating an access address for accessing the data item, the access address including a first address of the data item in the first server; in response to the frequency being higher than a predetermined threshold, copying the data item from the first server to a second server in the network attached storage which is proximate to the client, so as to form a data image; and updating the global namespace so as to add to the access address a second address of the data image in the second server whereby the data access efficiency of the network attached storage can be considerably improved.

6 Claims, 6 Drawing Sheets

(56) References Cited

U.S. PATENT DOCUMENTS

2015/0134625 A1* 5/2015 Lentini ............... H04L 67/2857
  707/692
2016/0321150 A1* 11/2016 Dankberg ........... G06F 11/2069

* cited by examiner

MANAGING NETWORK ATTACHED STORAGE

RELATED APPLICATION

This application claim priority from Chinese Patent Application Number CN201310750589.2 filed on Dec. 26, 2013 entitled "METHOD AND APPARATUS FOR MANAGING NETWORK ATTACHED STORAGE," the content and teachings of which are hereby incorporated by reference in their entirety.

FIELD

Embodiments of the present disclosure relate to storage management, and more specifically, for managing network attached storage (NAS).

BACKGROUND

With the development of data storage technology, various data storage devices provide users with a higher data storage capacity, and data access speed has also been enhanced to a large extent. The development of network technology opens up new directions for data storage, and data storage devices are no longer limited to be locally deployed on data access devices but may be located at any physical locations accessible via a network.

Until recently there has been developed network attached storage, which is a burgeoning data storage technology. By this technology, a storage device attached to a network can provide centralized data access services to users connected to the network. Specifically, a NAS system may be a high-performance file sharing and storage device, and users using NAS can share files via an IP network.

Network attached storage is widely adopted in large enterprises, especially transnational corporations. At the beginning of establishing a NAS system, typically an enterprise only deploys a couple of servers for data storage; with the expansion of the enterprise scale and the increase of branches, the enterprise starts to gradually expand the original server capacity and deploys more servers at a plurality of physical locations (e.g., different cities in different countries/regions).

In order to facilitate the management of servers distributed at different physical locations, a technical solution termed network attached storage federation/aggregation has been developed nowadays, which solution allows access to data having different servers via a global namespace. However, there exists a problem in the federation/aggregation: since the federation/aggregation is distributed at a plurality of physical locations, when these physical locations are too far apart or network communication bandwidths between them are not satisfactory, memories' response time to data access becomes longer, and data access efficiency is reduced.

SUMMARY

Therefore there is a need to ameliorate the deficiencies in the NAS space, and increase data access efficiency in network attached storage systems, and it is desirable to develop and implement a technical solution capable of reducing the access response time of network attached storage and further improving the data access efficiency. It is desired the technical solution can take into consideration a location relationship between a data access client and servers inside the network attached storage system and then cause a server that is closer to the data access client to respond to the access request based on the location relationship. In addition, it is further desired that the technical solution only involves modifications inside the network attached storage and is transparent to the client, so that the client can execute high-performance data access operations without a need to know internal details of the network attached storage system.

In one embodiment of the present disclosure, there is provided a method for managing network attached storage, that includes detecting frequency of access from a client to a data item that is in a first server in the network attached storage, a global namespace of the network attached storage indicating an access address for accessing the data item, the access address including a first address of the data item in the first server; in response to the frequency being higher than a predetermined threshold, copying the data item from the first server to a second server in the network attached storage that is proximate to the client, forming a data image; and updating the global namespace to add to the access address a second address of the data image in the second server.

In one embodiment of the present disclosure, the step of detecting frequency of access includes monitoring metadata associated with the access, the metadata comprising at least: a client ID, a timestamp and a data item ID; and calculating the frequency based on the metadata.

In one embodiment of the present disclosure, the second server is a server that is selected based on network topology of the network attached storage system and is proximate to the client.

In one embodiment of the present disclosure, there is provided an apparatus for managing network attached storage that includes: a detecting module configured to detect frequency of access from a client to a data item that is in a first server in the network attached storage, a global namespace of the network attached storage indicating an access address for accessing the data item, the access address including a first address of the data item in the first server; a copy module configured to, in response to the frequency being higher than a predetermined threshold, copy the data item from the first server to a second server in the network attached storage that is proximate to the client, forming a data image; and an updating module configured to update the global namespace to add to the access address a second address of the data image in the second server.

In one embodiment of the present disclosure, the detecting module includes a monitoring module configured to monitor metadata associated with the access, the metadata comprising at least: a client ID, a timestamp and a data item ID; and a calculating module configured to calculate the frequency based on the metadata.

In one embodiment of the present disclosure, the second server is a server that is selected based on network topology of the network attached storage system and is proximate to the client.

The methods and apparatuses according to the various embodiments of the present disclosure can be implemented without changing existing configuration of the network attached storage system. Specifically, by creating an image of accessed data at a server in the network attached storage system that is proximate to a data access client and letting the server respond to requests from the data access client, response latency caused by network transmission latency can be reduced considerably, and further the data access efficiency improved.

BRIEF DESCRIPTION OF THE SEVERAL VIEWS OF THE DRAWINGS

Through the more detailed description in the accompanying drawings, the above and other objects, features and advantages of the embodiments of the present disclosure will become more apparent. Several embodiments of the present disclosure are illustrated schematically and are not intended to limit the present invention. In the drawings.

DETAILED DESCRIPTION

Some embodiments will be described in more detail with reference to the accompanying drawings, in which these embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
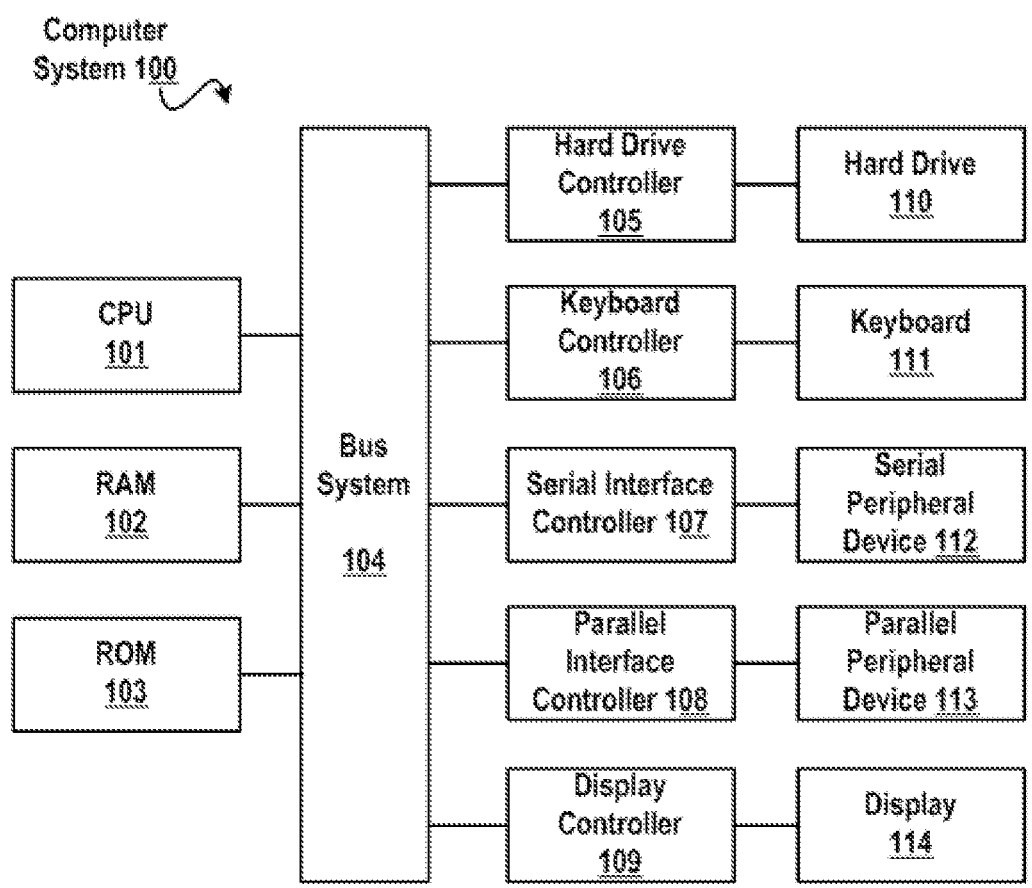
FIG. 1 schematically illustrates a block diagram of an exemplary computer system which is applicable to implement the embodiments of the present disclosure.

FIG. 1 illustrates an exemplary computer system 100 which is applicable to implement the embodiments of the present disclosure. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present disclosure. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
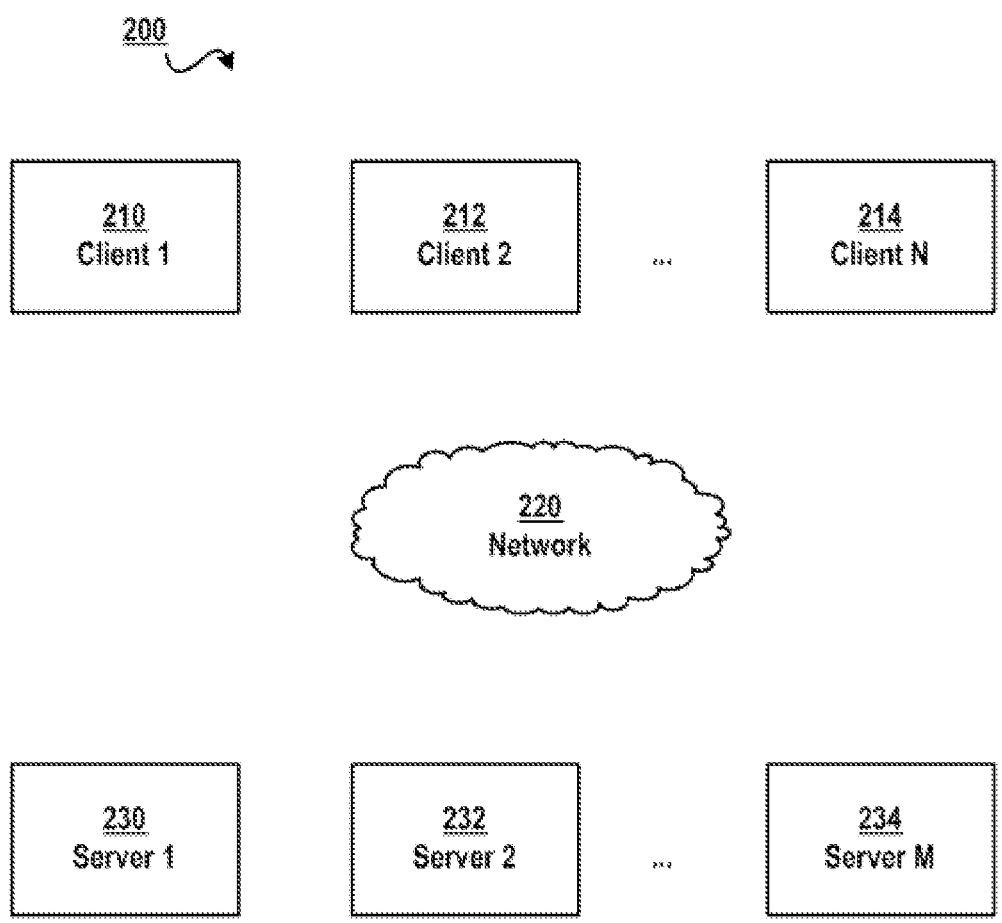
FIG. 2 schematically illustrates a schematic layout diagram of network attached storage according to one technical solution.

FIG. 2 illustrates a schematic view 200 of a structure of network attached storage according to one technical solution. In network attached storage, servers 1 230, 2 232, . . . , M 234 for storing files to be accessed by a user may be distributed across a plurality of geographic locations, and at this point, clients 1 210, 2 212, . . . , N 214 may also be located across a plurality of geographic locations, via any one of which the user may access files stored in any one of these servers.

Since a distance between the server and the client may possibly be large (e.g., thousands of kilometers or even more), an access request from the client for accessing data in the server might cause a long latency while being transmitted via a network; in addition, when returning to the client data from the server, also a long latency might be produced due to the impact of factors like distance, bandwidth and so on.

Figure 3:
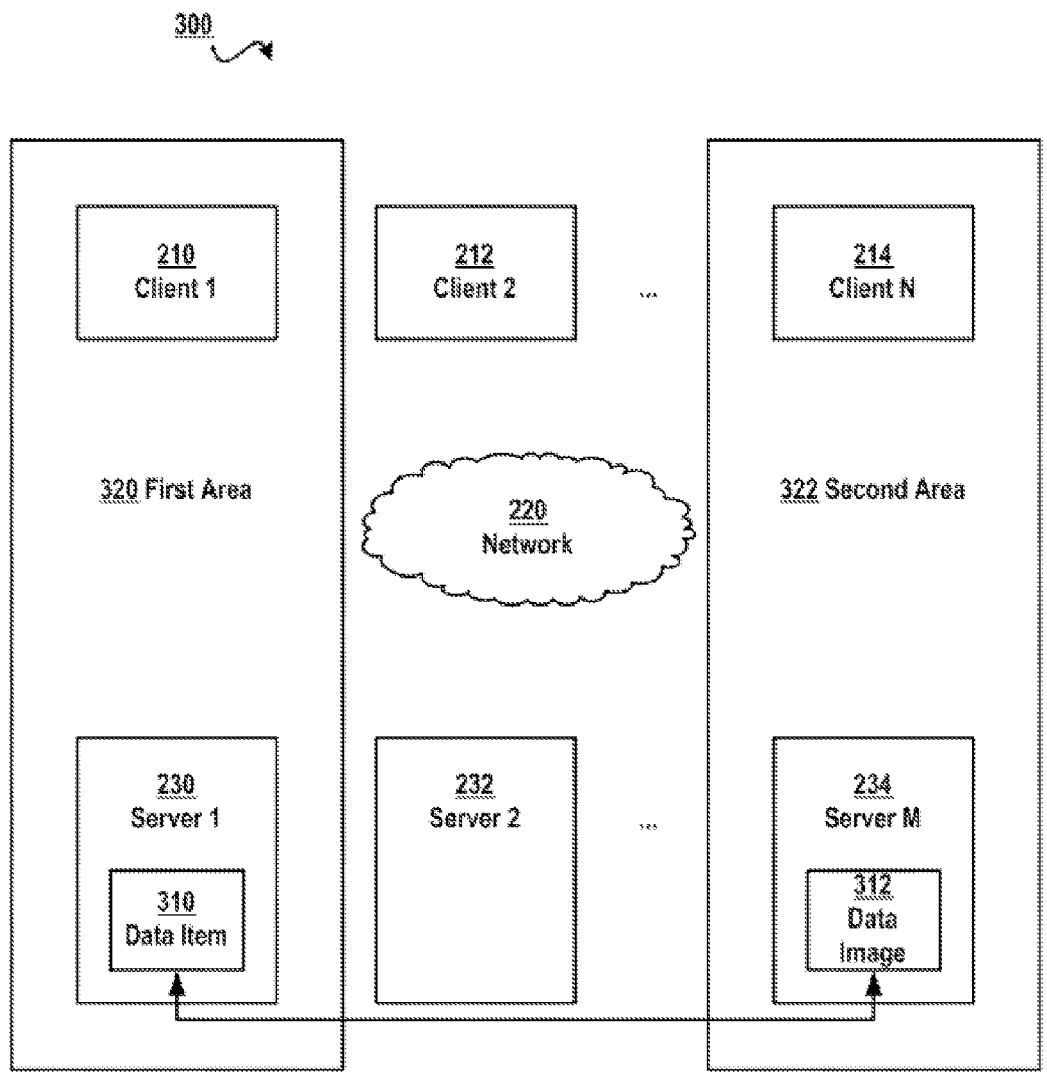
FIG. 3 schematically illustrates a schematic architecture diagram of a technical solution for managing network attached storage according to one embodiment of the present disclosure.

FIG. 3 illustrates a schematic architecture view of a technical solution 300 for managing network attached storage according to one embodiment of the present disclosure. According to the technical solution of the present disclosure, a location relationship between a data access client and servers in network attached storage may be considered, and based on the location relationship, a server closer to the data access client serves the access request. Therefore, when a file accessed by the client is on a server that is far apart from the client's location, the accessed file or part thereof (e.g., file trunks) may be copied to another server that is closer to the client, and the another server responds to the client.

Specifically, for example, a network attached storage system may be distributed across Beijing, New York and other cities; when a client located at Beijing frequently requests a file stored on a server located in New York, the file may be copied from the server in New York to a server in Beijing and thus data images are formed, and then the server in Beijing directly responds to access requests from the client based on data images.

As shown in FIG. 3, suppose server 1 230 is the server that is closest to (proximate to) client 1 210, and server M 234 is the client that is closest to client N 214, then it may be considered server 1 230 and client 1 210 are located in the same area (i.e., a first area 320) and server M 234 and client N 214 are located in the same area (i.e., a second area 322). At this point, a data item 310 may be copied from server 1 230 to server M 234 to form data image 312.

According to principles of the present disclosure, when client N 214 continues accessing data item 310, actually server M 234 directly responds to client N 214, and client N 214 is actually accessing data image 312 on server M 234 rather than data item 310 on server 1 230. Although there may exist in the network attached storage system one or more data images, the network attached storage system only presents a data item to the outside, and the user does not have to know he/she is accessing data on which server or whether the data is a source data item or a data image of the source data item.

As shown in FIG. 3, according to one embodiment of the present disclosure, a plurality of clients may concurrently access a file stored in network attached storage and may set an automatic synchronization mechanism to synchronize files or file images across a plurality of servers.

By means of the architecture as shown in FIG. 3, the data access efficiency of network attached storage can be improved. Specifically, various embodiments of the present disclosure provide a method for managing network attached storage, that includes detecting frequency of access from a client to a data item that is in a first server in the network attached storage, a global namespace of the network attached storage indicating an access address for accessing the data item, the access address including a first address of the data item in the first server; in response to the frequency being higher than a predetermined threshold, copying the data item from the first server to a second server in the network attached storage which is closer to or proximate to the client, thereby forming a data image; and updating the global namespace to add to the access address a second address of the data image in the second server.

Figure 4:
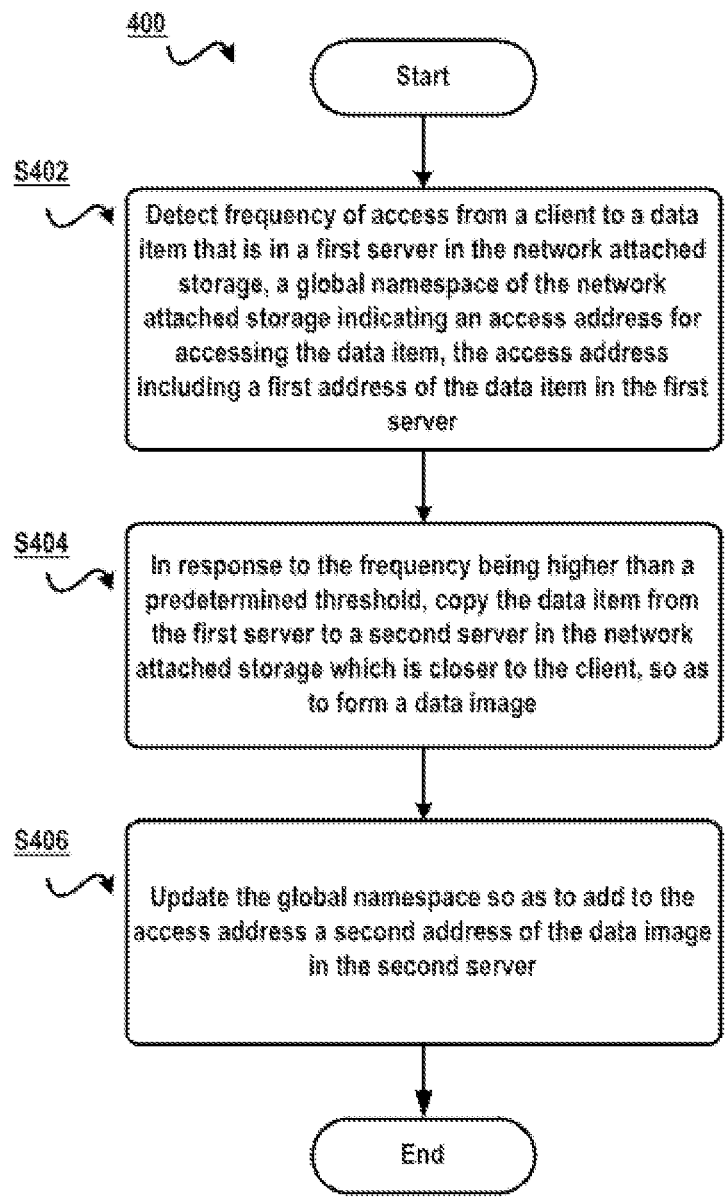
FIG. 4 schematically illustrates a schematic view of a method for managing network attached storage according to one embodiment of the present disclosure.

With reference to FIG. 4 now, detailed description is presented to the embodiment of the present disclosure. FIG. 4 schematically illustrates a schematic view 400 of a method for managing network attached storage according to one embodiment of the present disclosure.

In step 410, frequency of access from a client to a data item that is in a first server in the network attached storage is detected, a global namespace of the network attached storage indicating an access address for accessing the data item, the access address including a first address of the data item in the first server.

Note since the creation of a data image and the coordinated operation among multiple servers will take extra time, a comparison may be made between the extra time and access latency time of the network attached storage system, and the method of the present disclosure is executed only when the client's frequency of accessing data in a server in the network attached storage is relatively high. In addition, to be compatible with network attached storage in the prior art, a global namespace may be used in this embodiment to build a mapping relationship between a data item accessed by the client and a storage location of the data item.

In step 420, in response to the frequency being higher than a predetermined threshold, the data item is copied from the first server to a second server in the network attached storage which is proximate to the client, so as to form a data image. The network attached storage system's response efficiency towards to the client depends on a distance between the client and a server in the network attached storage system which stores accessed data. Therefore, it is possible to choose to create a data image on a second server in the network attached storage which is closer to (proximate to) the client.

In this manner, the second server responds to requests from the client based on the data image in subsequent operation steps. Although it takes time to form the data image, when the client frequently access the data item, a server in the network attached storage system which is proximate to the client responds to requests from the client, thereby reducing response time of the network attached storage and further increasing data access efficiency of the network attached storage.

In step 430, the global namespace is updated so as to add to the access address a second address of the data image in the second server. In this embodiment, to be compatible with network attached storage in the prior art, the global namespace is adopted to keep a mapping relationship among the data item and one or more data images. Therefore, when a new data image is formed in the network attached storage, the global namespace needs to be updated so as to add an address of the new data image to the access address. Specifically, the global namespace may comprise at least a data item ID, a data image ID and a server ID where the data image is located. Alternatively, the global namespace may further comprise other information, such as time when a data image is formed, etc.

By means of the above embodiment, a data image may be created on a second server in the network attached storage system which is closer to the client, with respect to the data item being accessed with higher frequency; then, subsequent access requests from the client may be responded to by the second server.

Note the embodiments of the present disclosure are not intended to limit the amount of data images, but when a plurality of clients concurrently access the same data item in the network attached storage, corresponding data images may be created in a plurality of servers (respectively close to the plurality of clients) in the network attached storage, and the plurality of servers each respond to a corresponding client based on a local data image. Further, when a plurality of clients are close to one another, a server that is closest to the plurality of clients may be one identical server, at which point only one data image needs to be created in the server and the plurality of clients are responded based on the same data image by the server.

In one embodiment of the present disclosure, the step of detecting frequency of access includes monitoring metadata associated with the access, the metadata at least including the client ID, the timestamp and the data item ID; and calculating the frequency based on the metadata. Specifically, an access count in a given time window may be judged based on the timestamp, and then the data access frequency is obtained.

In one embodiment of the present disclosure, the data item is a file or part of a file stored in the first server. For example, when a file is a large file (e.g., a file saving big data like a film), the file may be divided into a plurality of file trunks, and when the client accesses the file, a data image may be created on other server by taking a file trunk as a basic unit. File trunks may be identified in multiple modes. For example, a unique identifier may be set for each file trunk, or a file trunk may be identified by recording the file trunk's offset in the whole file and the file trunk length. In an embodiment where file trunks are adopted, metadata may include information on file trunks.

In one embodiment of the present disclosure, the step of detecting frequency of access further includes that when the network attached storage is in an in-band mode, detecting the frequency from a central router in the network attached storage; and when the network attached storage is in an out-band mode, detecting the frequency from the client.

The network attached storage includes an in-band mode and an out-band mode. In the in-band mode, the network attached storage system includes a NAS router, which can obtain global namespace information and is aware of concrete addresses of underlying servers within the network attached storage system. Clients are not aware of concrete settings of underlying servers in the network attached storage system, but access from various clients is uniformly managed by the NAS router. In the in-band mode, since the NAS router acts as an agent between the network attached storage system and clients, the frequency of access from each client to a data item inside the network attached storage system may be monitored at the NAS router.

In the out-band mode, there is no so-called uniform management by the NAS router, but each client directly communicates with a metadata server so as to obtain authorization of accessing a data item in a given server. Therefore, the frequency of access from a single client to a given data item may be obtained from the client.

In one embodiment of the present disclosure, the second server is a server that is selected based on network topology of the network attached storage system and is proximate (closest) to the client. Since a distance between the client and the server exerts a great impact on the response speed of the network attached storage, a server in the network attached storage which is proximate to the client may be selected as the second server.

In addition, the response speed may further be affected by network topology, so a server that is proxymate to the client may be selected based on network topology of the network attached storage. Note the "distance" in the present disclosure may refer to a physical distance, because within a small distance there are less network devices therebetween. In particular, this is more so when servers in the network attached storage are deployed across different countries/regions. The "distance" in the present disclosure may further refer to a logical distance between two devices. Since data forwarding between network devices might cause time latency, the response speed of the network attached storage can be improved by selecting a server with the shortest logical distance.

In one embodiment of the present disclosure, in response to a second client's second access to the data item in the first server, looking up the first address and the second address included in the access address; and synchronizing the data item with the data image according to operation in the second access based on the first address and the second address.

As described above, since addresses in the global namespace includes the data item in the network attached storage and access addresses of one or more data images of the data item, when an access request is received from a client subsequently, a server that is proximate to the client making the access request may be selected in the network attached storage according to address information contained in the global namespace.

Figure 5:
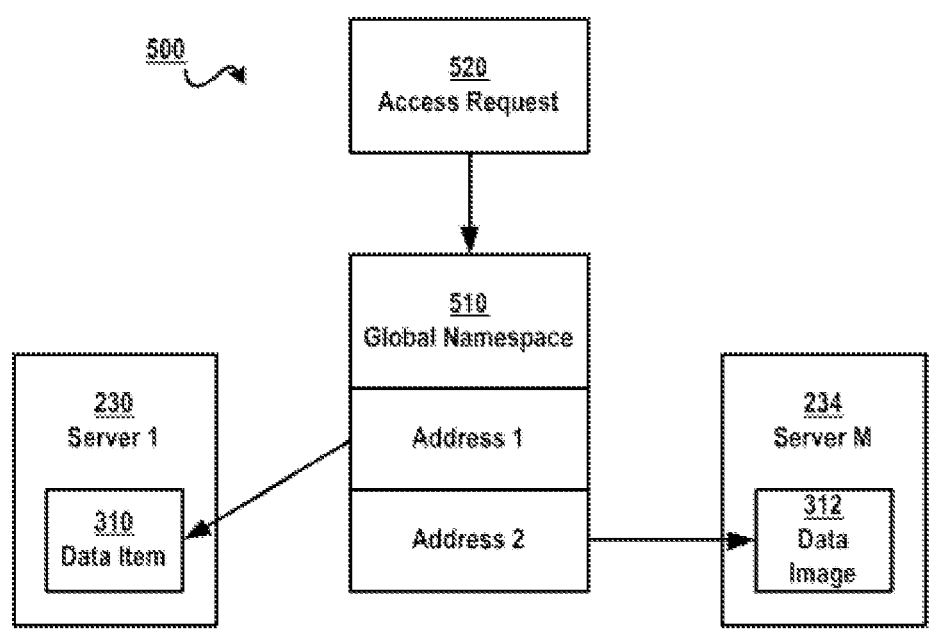
FIG. 5 schematically illustrates a schematic view of a technical solution for synchronizing a data item with a data image according to operation in second access based on a first address and a second address according to one embodiment of the present disclosure.

FIG. 5 illustrates a schematic view 500 of a technical solution for synchronizing the data item with the data image according to operation in the second access based on the first address and the second address according to one embodiment of the present invention. As described above, when frequency of access from a given client to a given data item in the network attached storage is higher than the predetermined threshold, a data image has been created at the second server that is closer to the client; when subsequently receiving another access request, the first server or the second server may respond to the another access request based on a location of a client making the another access request.

As shown in FIG. 5, when receiving an access request 520, an address 1 and an address 2 associated with the data item and the data image respectively may be looked up in a global namespace 510. Afterwards, data item 310 and data image 312 may be accessed from a responding server via address 1 and address 2.

In addition, those skilled in the art may understand that a data item needs to be synchronized with various data images in order to ensure the consistency between the data item and these data images. The synchronization mentioned here is to ensure the data item is consistent with any time of various data images. Those skilled in the art may understand that data access operations comprise read operations and write operations; when the client is performing a read operation, content of the data item/data image will not be changed, so no additional synchronization step is needed; but when executing a write operation, since the data item/data image might be changed, a synchronization step is needed in order to ensure the consistency of data in various servers.

In one embodiment of the present disclosure, the second client is a client that is different from or the same as the client. Note the context of the present invention is not intended to limit from which client a subsequent data access request is issued; for example, an access request may be issued from a client triggering a copy operation, or an access request may be issued from other client than the client.

For example, since a client A in Beijing frequently accesses a file 1 on a server 1 in New York, a file image 2 of file 1 is created on a server 2 in Beijing. At this point, another client B in Beijing might also want to access file 1, and then at this point, server 2 in Beijing may directly respond to client B; and meanwhile, if client A continues accessing file 1, then server 2 may concurrently respond to clients A and B based on file image 2 on server 2.

According to the embodiments of the present disclosure, the synchronization operation may be executed using various approaches. For example, the data item may be synchronized with the data image based on a timestamp of the write operation, or a plurality of clients may be prevented from concurrently performing the write operation to one data item, based on a locking policy.

In one embodiment of the present disclosure, synchronizing the data item with the data image according to operation in the second access based on the first address and the second address includes in response to the operation being write operation, monitoring a timestamp of the write operation; and executing the write operation with respect to the data item and the data image according to the timestamp.

According to the technical solution of the present disclosure, clients outside the network attached storage do not learn that there might exist in the network attached storage other data image than a data item, so the consistency between the data item and the other data image in the network attached storage has to be ensured. When a plurality of clients are concurrently executing write operations, it should be ensured that the same write operation is executed with respect to the data item and the data image, i.e., the data item is synchronized with the data image.

Since there is a chronological order in a plurality of write operations, concrete execution time of each write operation has to be determined. In one embodiment of the present disclosure, execution time of each write operation may be accurately recorded in a manner of obtaining Coordinated Universal Time from a satellite. Specifically, Coordinated Universal Time may be obtained from a satellite periodically over a given time period. Further, within the time period, clocks of various servers in the network attached storage system may be synchronized based on an atomic clock, so as to ensure a timestamp of each write operation is based on the same reference clock. Next, since the atomic clock can accurately record a chronological order in various timestamps due to its extremely high precision, various write operations to the data item and the data image may be executed according to the chronological order. For example, a write operation 1 to the data item and the data image is executed first, and afterwards a write operation 2 to the data item and the data image is executed.

In one embodiment of the present disclosure, executing the write operation with respect to the data item and the data image according to the timestamp includes that in response to the write operation conflicting with another write operation, notifying the write operation failure or rolling back the data item and the data image to previous content.

Those skilled in the art may understand when there is no conflict between various write operations, these write operations may be executed one after another according to an order of timestamps; when two or more write operations have conflict between them, then a write failure may occur. At this point, two or more clients executing these write operations may be notified of the write operation failure, or the data item and the data image are rolled back to previous content. Those skilled in the art may understand rollback is a term in the data storage field and is not detailed here.

In one embodiment of the present disclosure, synchronizing the data item with the data image according to operation in the second access based on the first address and the second address includes that in response to the operation being a write operation, executing the write operation with respect to the data item and the data image, wherein other write operation is prohibited during the write operation.

In addition to the above timestamp-based approach, the embodiments of the present disclosure may exclusively execute data write operations by using datalock. Specifically, when detecting a data access operation, the accessed data item is locked. The network attached storage presents only one data item to the outside, while there might multiple data images in the network attached storage. The locking here refers to locking an accessed data item and data images associated with the data item. During locking, other write operation to the data item and associated data images is generally prohibited. In this manner, the consistency between the data item and the data images can be ensured.

In one embodiment of the present disclosure, the timestamp may be used in conjunction with the datalock. For example, when executing write operations sequentially in a chronological order, a data item and associated data images may be locked and the locking is released upon completion of writes.

In one embodiment of the present disclosure, a correspondence relationship among a data item, a data image and a client accessing the data item and the data image may be maintained. After an access operation from a certain client ends, corresponding data images may be removed from a server responding to the access operation, and data in the global namespace is updated.

Figure 6:
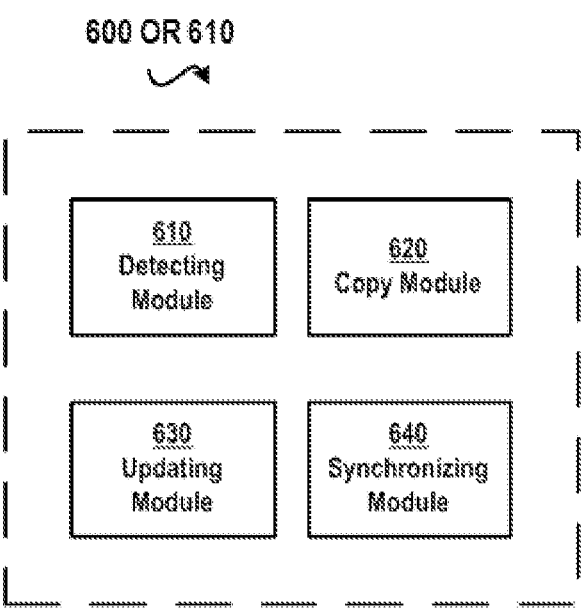
FIG. 6 schematically illustrates a block diagram of an apparatus for managing network attached storage according to one embodiment of the present disclosure.

FIG. 6 schematically illustrates a block diagram of an apparatus 600 for managing network attached storage according to one embodiment of the present disclosure. Specifically, this figure shows an apparatus for managing network attached storage, that includes a detecting module 610 configured to detect frequency of access from a client to a data item that is in a first server in the network attached storage, a global namespace of the network attached storage indicating an access address for accessing the data item, the access address including a first address of the data item in the first server; a copy module 620 configured to, in response to the frequency being higher than a predetermined threshold, copy the data item from the first server to a second server in the network attached storage which is closer to the client, so as to form a data image; and an updating module 630 configured to update the global namespace so as to add to the access address a second address of the data image in the second server. The copy module 620 and the updating module 630 can be combined into the detecting module 610 and the detecting module can perform the task of all the three modules together.

In one embodiment of the present invention, detecting module 610 includes a monitoring module configured to monitor metadata associated with the access, the metadata at least including the client ID, the timestamp and the data item ID; and a calculating module configured to calculate the frequency based on the metadata. The monitoring module can also be part of the detecting module, such that all modules are embedded within a single module.

In one embodiment of the present disclosure, the second server is a server that is selected based on network topology of the network attached storage system and is closest to the client.

In one embodiment of the present disclosure, a lookup module configured to, in response to a second client's second access to the data item in the first server, look up the first address and the second address in the access address; and a synchronizing module 640 configured to synchronize the data item with the data image according to operation in the second access based on the first address and the second address. The lookup module and the synchronization module can also be part of the detecting module, such that all modules are embedded within a single module.

In one embodiment of the present disclosure, the second client is a client that is different from or the same as the client.

In one embodiment of the present disclosure, synchronizing module 640 comprises: a time monitoring module configured to, in response to the operation being write operation, monitor a timestamp of the write operation; and a first write module configured to execute the write operation with respect to the data item and the data image according to the timestamp. The time monitoring module and the first write module can also be part of the detecting module, such that all modules are embedded within a single module.

In one embodiment of the present disclosure, the first write module includes a conflict handling module configured to, in response to the write operation conflicting with another write operation, notify the write operation failure or rolling back the data item and the data image to previous content.

The conflict handling module can also be part of the detecting module, such that all modules are embedded within a single module In one embodiment of the present disclosure, synchronizing module 640 includes a second write module configured to, in response to the operation being a write operation, execute the write operation with respect to the data item and the data image, wherein other write operation is prohibited during the write operation. The second write module can also be part of the detecting module, such that all modules are embedded within a single module In one embodiment of the present disclosure, detecting module 610 includes a first detecting module configured to, when the network attached storage is in an in-band mode, detect the frequency from a central router in the network attached storage; and a second detecting module configured to, when the network attached storage is in an out-band mode, detect the frequency from the client. The first detecting monitoring module and the second detecting module can also be part of the detecting module, such that all modules are embedded within a single module In one embodiment of the present disclosure, the data item is a file stored in the first server or part of the file.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing network attached storage, the method comprising:
   detecting a frequency of access from a client to a data item on a first server in the network attached storage, a global namespace of the network attached storage indicating an access address for accessing the data item, the access address including a first address of the data item in the first server;
   in response to the frequency being higher than a predetermined threshold, copying the data item from the first server to a second server in the network attached storage, the second server being proximate to the client, thereby forming a data image on the second server; and updating the global namespace to add to the access address a second address of the data image in the second server wherein detecting frequency of access from a client to a data item that is in a first server in the network attached storage comprises:

monitoring metadata associated with the access, the metadata at least comprising:

a client ID, a timestamp and a data item ID; and calculating the frequency based on the metadata;

wherein the second server is a server selected based on network topology of the network attached storage system and is proximate to the client;

in response to a second client's second access to the data item on the first server, looking up the first address and the second address in the access address;

synchronizing the data item with the data image in accordance with an operation in the second access based on the first address and the second address;

wherein synchronizing the data item with the data image in accordance with an operation in the second access based on the first address and the second address comprises:

in response to the operation being a write operation, monitoring a timestamp of the write operation; and executing the write operation with respect to the data item and the data image according to the timestamp.

2. The method according to claim 1, wherein the second client is at least one of a client that is different from or the same as the client.

3. The method according to claim 1, further comprising:

in response to the write operation conflicting with another write operation, performing at least one of:

notifying of a failure of the write operation; or rolling back the data item and the data image to previous content.

4. The method according to claim 1, further comprises:

in response to the operation being a write operation, executing the write operation with respect to the data item and the data image, wherein other write operation is prohibited during the write operation.

5. The method according to claim 1, wherein the step of detecting frequency of access from a client to a data item that is in a first server in the network attached storage comprises:

when the network attached storage is in an in-band mode, detecting the frequency from a central router in the network attached storage; and when the network attached storage is in an out-band mode, detecting the frequency from the client.

6. The method according to claim 1, wherein the data item is a file stored in the first server or part of the file.

* * * * *